United States Patent

[11] 3,596,818

[72] Inventors Roger Charles Curtis
New Haven, Conn.;
William Henry Loescher, Harrison, N.Y.;
William Edward Springer, Shelton, Conn.

[21] Appl. No. 770,696
[22] Filed Oct. 25, 1968
[45] Patented Aug. 3, 1971
[73] Assignee Dictaphone Corporation
Bridgeport, Conn.

[54] TAPE-FEEDING AND STORAGE APPARATUS WITH TENSION-SENSING MEANS
5 Claims, 11 Drawing Figs.

[52] U.S. Cl. .......... 226/25, 226/50, 226/118
[51] Int. Cl. .......... B65h 25/22
[50] Field of Search .......... 226/49, 50, 51, 118, 119, 25; 179/100.2 Z; 242/189, 190, 197

[56] References Cited

UNITED STATES PATENTS

| | | | |
|---|---|---|---|
| 2,988,604 | 6/1961 | Nye | 179/100.2 Z |
| 2,989,594 | 6/1961 | McKaig | 179/100.2 Z |
| 3,417,938 | 12/1968 | Markakis et al. | 179/100.2 Z |

FOREIGN PATENTS

| | | | |
|---|---|---|---|
| 685,032 | 12/1952 | Great Britain | 179/100.2 (Z) |
| 958,817 | 5/1964 | Great Britain | 179/100.2 (Z) |

OTHER REFERENCES

Rocca, " Tape Cassette," IBM Technical Disclosure Bulletin, Vol. 10, No. 11 April 1968

*Primary Examiner*—Allen N. Knowles
*Attorney*—Curtis, Morris & Safford

ABSTRACT: A recording and transcribing system including a single-bin, random-wind tape storage magazine to store an endless loop of magnetic tape in random folds. The tape is drawn from the magazine past a recording unit and then is fed back to the magazine where it may be stored in random folds until drawn up past a transcribing unit and then back into the magazine again. Both the recording and transcribing units are provided with bidirectional tape drive capability and the tape storage magazine includes tape tauntness-sensing mechanisms to disconnect either or both of the tape drive units if the tape is drawn taut during operation.

INVENTORS
ROGER CHARLES CURTIS
WILLIAM HENRY LOESCHER
BY WILLIAM EDWARD SPRINGER

Curtis, Morris & Safford
ATTORNEYS

INVENTORS
ROGER CHARLES CURTIS
WILLIAM HENRY LOESCHER
BY WILLIAM EDWARD SPRINGER

Curtis, Morris & Safford
ATTORNEYS

INVENTORS
ROGER CHARLES CURTIS
WILLIAM HENRY LOESCHER
BY WILLIAM EDWARD SPRINGER

Curtis, Morris & Safford
ATTORNEYS

INVENTORS
ROGER CHARLES CURTIS
WILLIAM HENRY LOESCHER
BY WILLIAM EDWARD SPRINGER

Curtis, Morris & Safford
ATTORNEYS

TAPE-FEEDING AND STORAGE APPARATUS WITH TENSION-SENSING MEANS

This invention relates to a system for recording and transcribing dictated messages and/or other intelligence, and more particularly to recording and transcribing systems which utilize an endless loop of magnetic tape which is stored in random fashion is a single-bin tape storage magazine thus, making it possible for dictation and/or transcription to be done from remote locations either simultaneously or separately.

Recording and transcribing systems utilizing an endless loop of magnetic tape so that both dictation and transcription can be accomplished at the same time have been proposed heretofore. Examples of such prior art recording and transcribing systems are those shown in U.S. Pat. No. 2,988,604 to Nye and U.S. Pat. No. 2,989,594 to McKaig. Each of those units use a double-bin tape storage, the first storage bin to store tape after messages have been recorded thereon and the second storage bin to store tape after the transcriber has listened to the recorded messages. Both of these storage bins must be large enough to accommodate all of the tape as, for example, when the dictator has recorded on the whole length of tape before any of it has been transcribed, or when all of the tape has been passed through the transcriber unit without any recording taking place. Hence, with such an arrangement, it is necessary to have two storage bins each large enough to accommodate the complete length of tape to be used. Additionally, the recording and transcribing systems and the tape storage bins are so arranged that it is difficult to disengage the tape and the associated storage bins from the recording and transcribing portion of the machine. Thus, it is relatively difficult to change either the tape storage bins, or to insert a new loop of tape in the event of tape breakage or a longer loop of tape if more dictation is required than the original tape capacity affords.

Accordingly, it is an object of the present invention to provide an endless loop magnetic tape recording and transcribing system wherein the endless loop is random wound in a single storage bin.

It is a further object of the present invention to provide a random-wind, single-bin recording and transcribing system wherein the single-bin tape storage mechanism is readily removable in the form of a magazine component to afford ready interchangeability of various tape magazine units.

It is a still further object of the present invention to provide a single-bin, random-wind tape storage magazine for use in a recording and transcribing system wherein provision is made to sense tape tautness within the magazine.

It is yet another object of the present invention to provide a new and improved recording and transcribing system which can be operated with a single-bin tape storage arrangement for the recording and transcribing of messages either separately or simultaneously, and wherein provision is made to prevent unwanted tape tautness which will cause tape breakage.

In a preferred embodiment of the present invention a single-bin, random-wind tape storage magazine is provided which houses an endless loop of magnetic tape. The tape storage housing within the magazine is of a width slightly greater than the width of magnetic tape used. Hence, the tape is allowed to fall in random loops within the magazine without entangling or snarling. The tape is fed from one point in the magazine to recording and reproducing heads associated with the recording unit and provision is made to drive the tape both in the forward and reverse direction so that a dictator may record messages on the tape and then reverse the tape to play back portions of the dictated message. The tape is then returned to the tape storage magazine from which it can move to the transcribing unit which is similarly provided with bidirectional drive capability so that a transcriber can listen to the dictated messages on the tape and, if desired, reverse the direction of tape movement to play back portions of the dictated messages. Suitable tape tautness-sensing devices are positioned within the single-bin tape storage magazine to sense tape tautness and disconnect the tape drives to prevent tape breakage.

Figure 2:
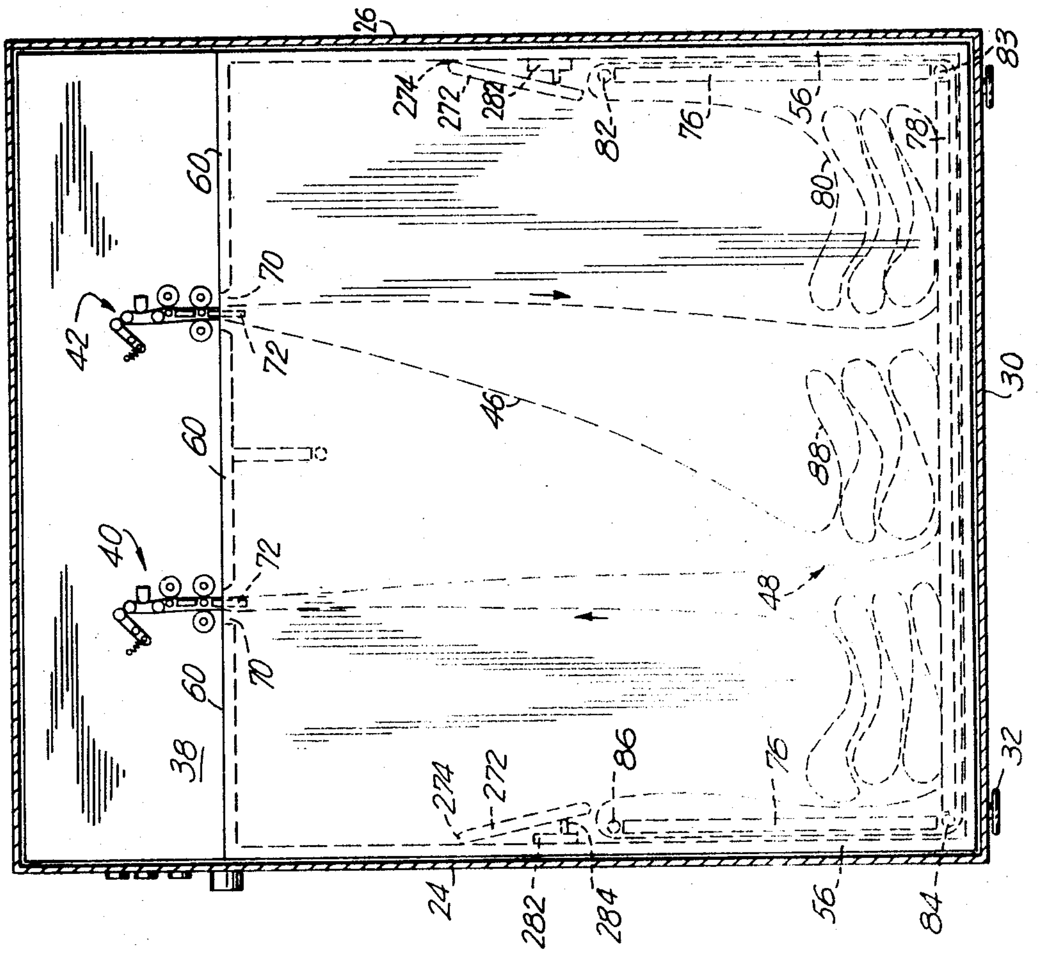
FIG. 2 is a vertical, sectional view taken on line 2–2 of FIG. 1 showing the single-bin tape storage magazine associated with the dictating and transcribing system.
Figure 1:
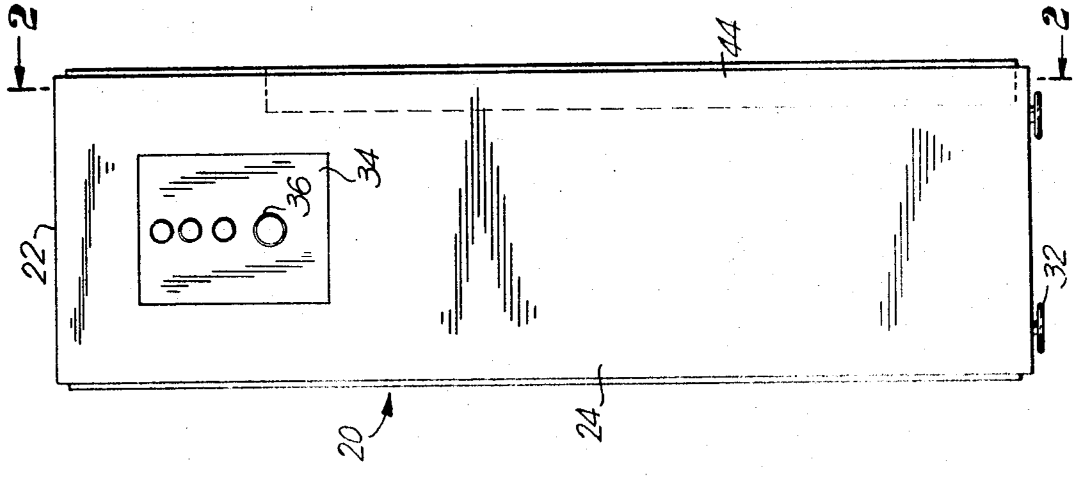
FIG. 1 is an elevational view of one side of the dictating and transcribing system of the present invention.

With reference to FIGS. 1 and 2, it is seen that the recording and transcribing system 20 includes a rectangular frame housing 22 having opposed sidewalls 24 and 26, a top wall 28 and a bottom wall 30 and is supported by suitable glide caster members 32. A control panel 34 is provided with various control knobs 36 to control the recording and transcribing system. The system 20 includes a main frame support plate 38 mounting a recording station 40, a transcribing station 42 and a separable tape storage magazine 44, details of which will be explained more fully hereinbelow.

Stored within tape magazine 44 is a supply of magnetic tape 46 suitable for recording and transcribing which is in the form of an endless loop of a sufficient length to provide, for example, 2 hours of continuous dictation. Hence, the magazine 44 is sufficiently large to allow for an accumulation of random loops 48 of tape 46 which are fed into and out of magazine 44 by means of the tape drive systems in the transcribing unit 42 and recording unit 40.

With reference to FIGS. 3 to 7, it is seen that the tape storage magazine 44 includes a front rectangular panel 50 and a rear rectangular panel 52 spaced from each other to define a tape storage cavity 54 therebetween by side spacer members 56, lower spacer member 58 and three top spacer members 60. Panels 50 and 52 are joined to their appropriate spacer members (see FIG. 6) by means of a bolt 62 passing through plate 50, a spacer member and plate 52. The assembly is secured by a washer 64 and nut 66 on the threaded end 68 of bolt 62. Plates 50 and 52 are spaced from each other a distance "D" which is slightly greater than the width of the magnetic tape 46 to be stored within magazine 44. Hence, as the tape 46 is fed into the magazine 44 the tape is restrained to random winding in a plurality of loops 48 in a space defined by the cavity 54. Due to the lateral confinement of the tape storage cavity 54 the tape is kept from twisting and misaligning which would cause tangling of the tape.

The front and rear panels 50 and 52, the side strips 56, lower strip 58 and top strips 60 provide a completely enclosed magazine to house the stored tape and the tape exits from the top of the magazine through openings 70 (see FIG. 2 as well) between each of the three spacer sections 60 in the top of magazine 44. Midway of each of openings 70 is located a tape guide bar 72 (see FIG. 5) which is rigidly secured to rear plate member 52 in any convenient manner, for example bolts 74 press fit into suitable apertures 76 in tape guide bar 72. The tape 46 is initially looped over each of the tape guides 72 so that it exits from the magazine 44 on one side of tape guide 72 in the opening 70 and returns into the magazine on the other side of the tape guide 72.

Figures 3, 4, 5, 6, 7:
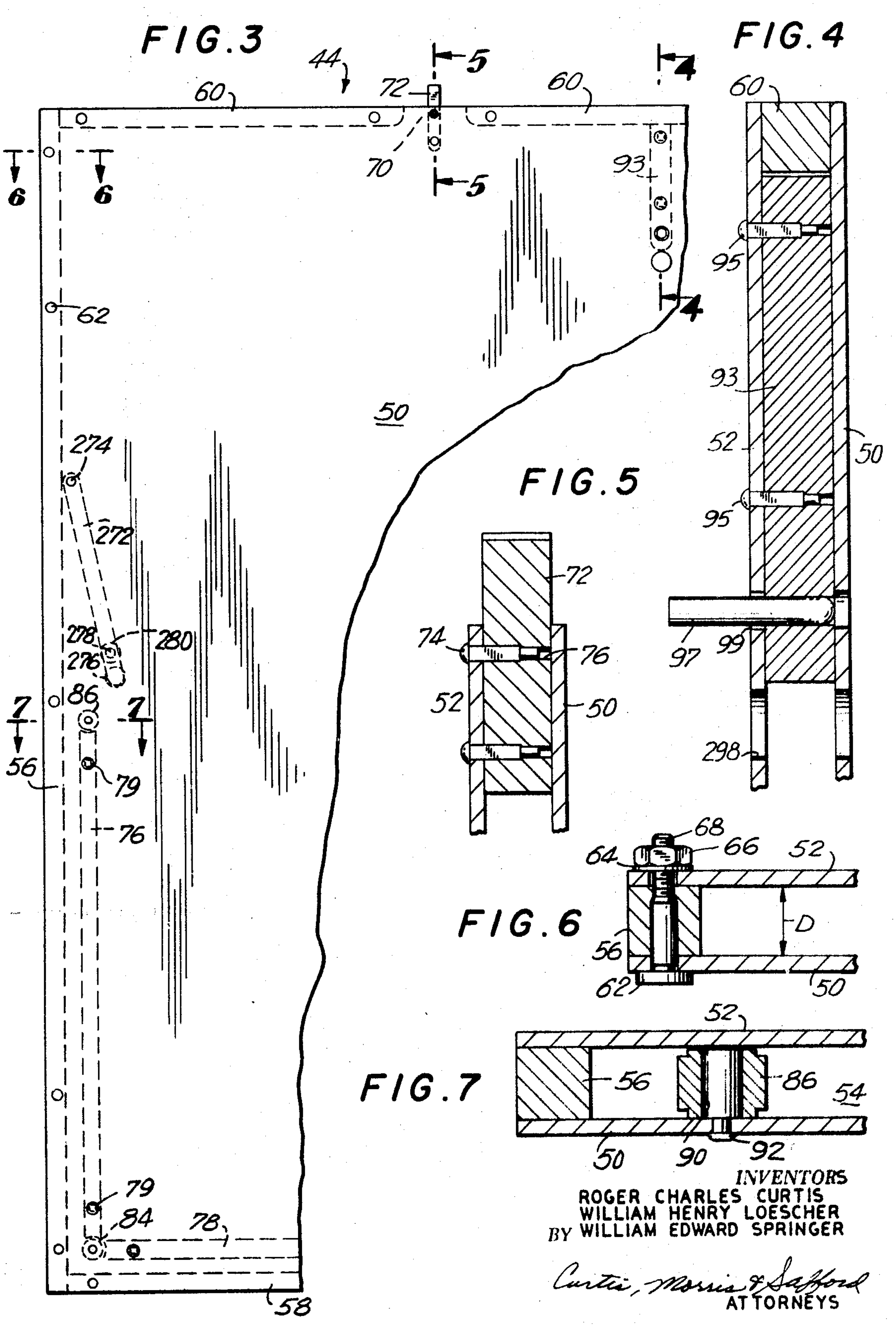
FIG. 3 is an enlarged, elevational view of a portion of the single-bin tape storage magazine.
FIG. 4 is a vertical, sectional view, on an enlarged scale, taken on line 4–4 of FIG. 3.
FIG. 5 is a vertical, sectional view, on an enlarged scale, taken on line 5–5 of FIG. 3.
FIG. 6 is a horizontal, sectional view, on an enlarged scale, taken on line 6–6 of FIG. 3.
FIG. 7 is a horizontal, sectional view, on an enlarged scale, taken on line 7–7 of FIG. 3.
Figure 9:
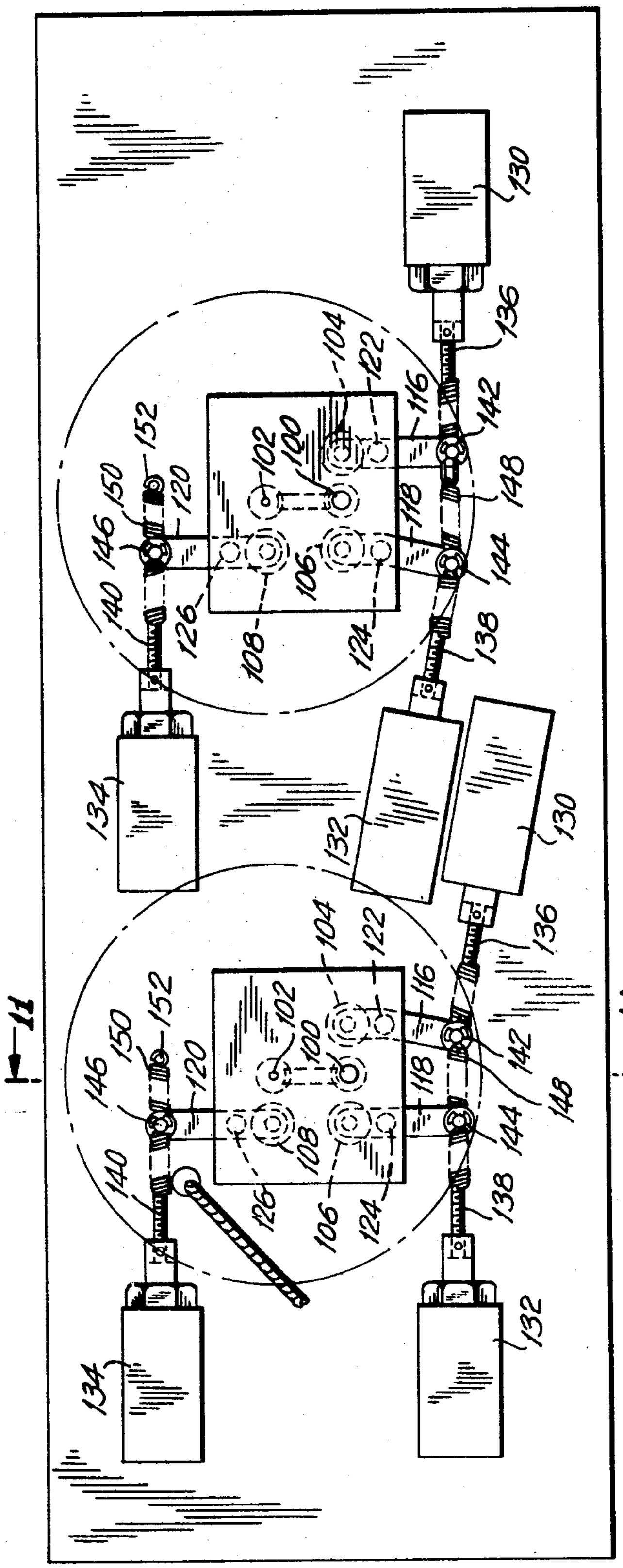
FIG. 9 is an elevational view of the rear portion of the tape drive system.

With reference to FIGS. 2 and 3, it is seen that a guided path of tape travel is provided in the lower portion of magazine 44 by means of a spaced tape guide track 74 which includes a pair of vertical tape guide track members 76 on each side of the magazine 44 and a bottom tape guide track 78. The tracks 76 and 78 are spaced from spacer elements 56 and 58, respectively, and are rigidly secured to panels 50 and 52 in any convenient manner, for example by bolts 79. The path of tape travel, as illustrated in FIG. 2 by the direction arrow, is from the transcribing unit 42, through opening 70 immediately below the transcribing unit into the magazine to a random-wind tape storage pile 80. From this storage pile 80 the tape is drawn by the tape drive in recording unit 40 up over a roller element 82 located at the upper end of tape guide track 76 then down in the guided path of tape travel between tape guide track 76 and spacer element 56. The tape is passed around another tape roller element 83 in one corner of the magazine, along the guided path of tape travel between tape guide track 74 and spacer element 58 and over a roller element 84 in the opposite corner of the magazine. The tape then is passed up the guided path of tape travel between spacer element 56 and tape guide track 76, over a roller element 86 at the upper end of tape guide 76 and out of the magazine through opening 70 to the recording unit 40. The tape is then passed back into the magazine 44 to be stored in a random-wound tape pile 88. As seen in FIG. 7, roller element 86 as well as roller element 82, 83 and 84 are mounted to be rotatable in any convenient manner, for example on a roller member 90 secured to the plate member 50 by a rivet 92.

With reference to FIG. 4, in the top center of the tape magazine 44 there is provided a support bar 93 rigidly secured to plate member 52 by suitable bolts 95. A locating pin 97 is secured, as by press fit, in support bar 93 and extends through a hole 99 beyond plate 52. Pin 97 is used to locate magazine 44 with respect to main support plate 38 when the magazine is installed in the system.

Figure 8:
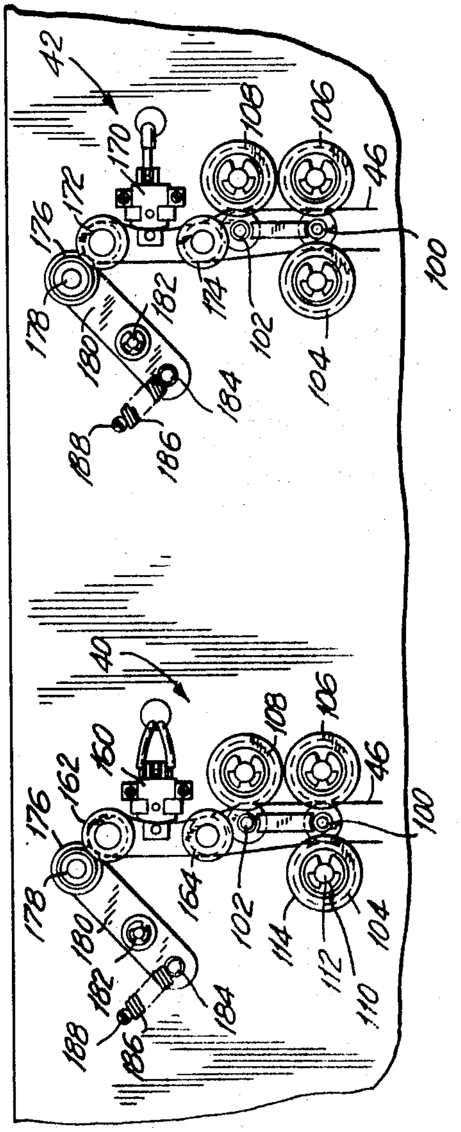
FIG. 8 is an enlarged, elevational view of the front portion of the dictating and transcribing system showing the path of tape travel past the dictating and transcribing units.

With reference now to FIG. 8, there is shown the path of travel of tape 46 through the recording unit 40 and transcribing unit 42. Each of the units 40 and 42 is provided with two tape-drive capstans 100 and 102, the capstan 100 being a high-speed forward and reverse tape-drive and the capstans 102 being slow-speed forward tape drives. Both of the capstans 100 and 102 have associated with them rotatably mounted, solenoid-actuated pinch rollers or pucks 104, 106 and 108, respectively. Each of the pucks 104, 106 and 108 includes a hub portion 110 rotatably mounted on a pin shaft 112 and has a rim portion 114, for example of rubber or rubberlike composition, adapted to frictionally engage the magnetic tape 46. Each pin shaft 112 is mounted to a pivot arm 116, 118 and 120, respectively, which is pivotally secured to the main panel support 38, as at 122, 124 and 126, respectively. Thus, each of the arms 116, 118 and 120 is mounted to pivot about its respective pivot points allowing the pucks 104, 106 and 108 to rock or pivot into and out of contact with the tape drive capstans 100 and 102.

The pivoting movement of the pucks 104, 106 and 108 is controlled by three solenoids 130, 132 and 134, respectively. Each of the solenoids functions in a conventional manner, i.e. causes retraction of a plunger member when an electrical current is supplied to the solenoid, and each solenoid has associated with it a plunger extension 136, 138 and 140 which is pivotally connected to pivot arms 116, 118 and 120, respectively as at 142, 144 and 146. A tension spring member 148 is secured between the ends of pivot arms 116 and 118 thus drawing the lower ends of these pivot arms toward each other causing the pivot arms to pivot around pivot points 122 and 124 thereby pivoting both of the pucks 104 and 106 away from the drive capstan 100. In like manner, a tension spring 150 is secured at one end to pivot arm 120 and at its other end to a spring support pin 152 thereby to urge puck 108 out of contact with drive capstan 102. Thus, when the magnetic tape 46 is driven forward by the slow-speed drive capstan 102, solenoid 134 will be actuated retracting plunger 140 to rock pivot arm 120, against the spring tension 150, so that puck 108 contacts drive capstan 102. The tape 46 is now pinched between the puck 108 and the capstan 102 and the rotating capstan 102 then drives the tape in the direction of capstan rotation. If it is desired to run the tape 46 at high-speed, solenoid 134 is disengaged, plunger 140 extends and puck 108 pivots away from contact with the tape 46 and drive capstan 102. Solenoid 132 is then actuated retracting plunger 138 which causes pivoting of pivot arm 118 which then pivots puck 106 into contact with the tape 46 and high-speed capstan 100. The tape is now driven forward at high speed in the direction of capstan rotation. Similarly, when it is desired to reverse the direction of tape movement, solenoid 132 is disengaged, plunger 138 extends and puck 106 is pivoted away from contact with the drive capstan 100. Solenoid 130 is then actuated retracting plunger 136 and pivoting pivot arm 116 so that the puck 104 moves into contact with the drive capstan 100. Simultaneously with the engagement and the disengagement of solenoids 130 and 132, the direction of rotation of capstan 100 is changed, for example from clockwise to counterclockwise, and puck 104 is pivoted into contact with capstan 100 pinching the tape 46 against capstan 100 which is now rotating in the opposite direction at high speed.

The recording station 40 includes a combined erase and record unit 160 which is positioned between tape guide rollers 162 and 164 to guide the tape over the erase and record unit 160. In like manner, a transcribe unit 170 is provided at the transcribe station 42 and the tape is guided between guide rollers 172 and 174 so that the tape passes over the transcribe unit. The record unit 160 and transcribe unit 170 are suitably electrically connected to electronic amplification equipment (not shown).

Each station is also provided with a pinch roller 176 which is rotatably mounted as at 178 to one end of a pivot arm 180 pivotally secured at 182 to the main support plate 38. The other end of pivot arm 180 includes an extending pin 184 around which is secured one end of a spring 186. The other end of spring 186 is fixed to the plate 38, for example, by a bolt 188. Thus, the pinch roller 176 is urged by spring 186 into rolling contact with the guide rollers 162 or 172 and tends to maintain the tape in intimate contact with the respective guide rollers at all times.

Figure 11:
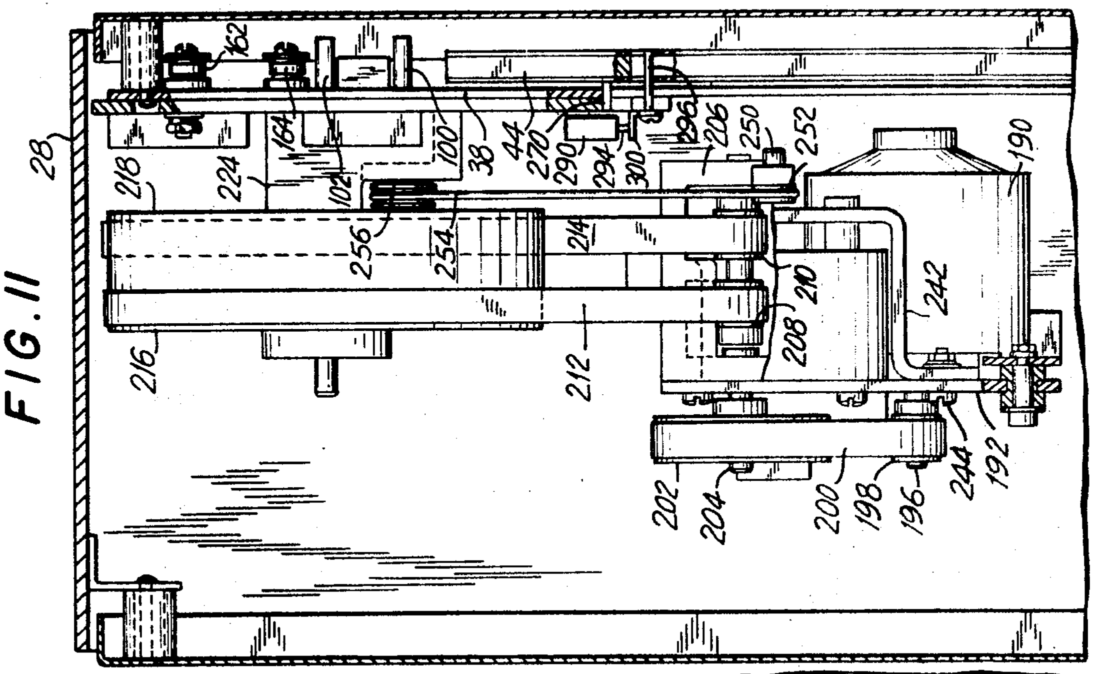
FIG. 11 is a side elevational view showing the motors and capstan drives.
Figure 10:
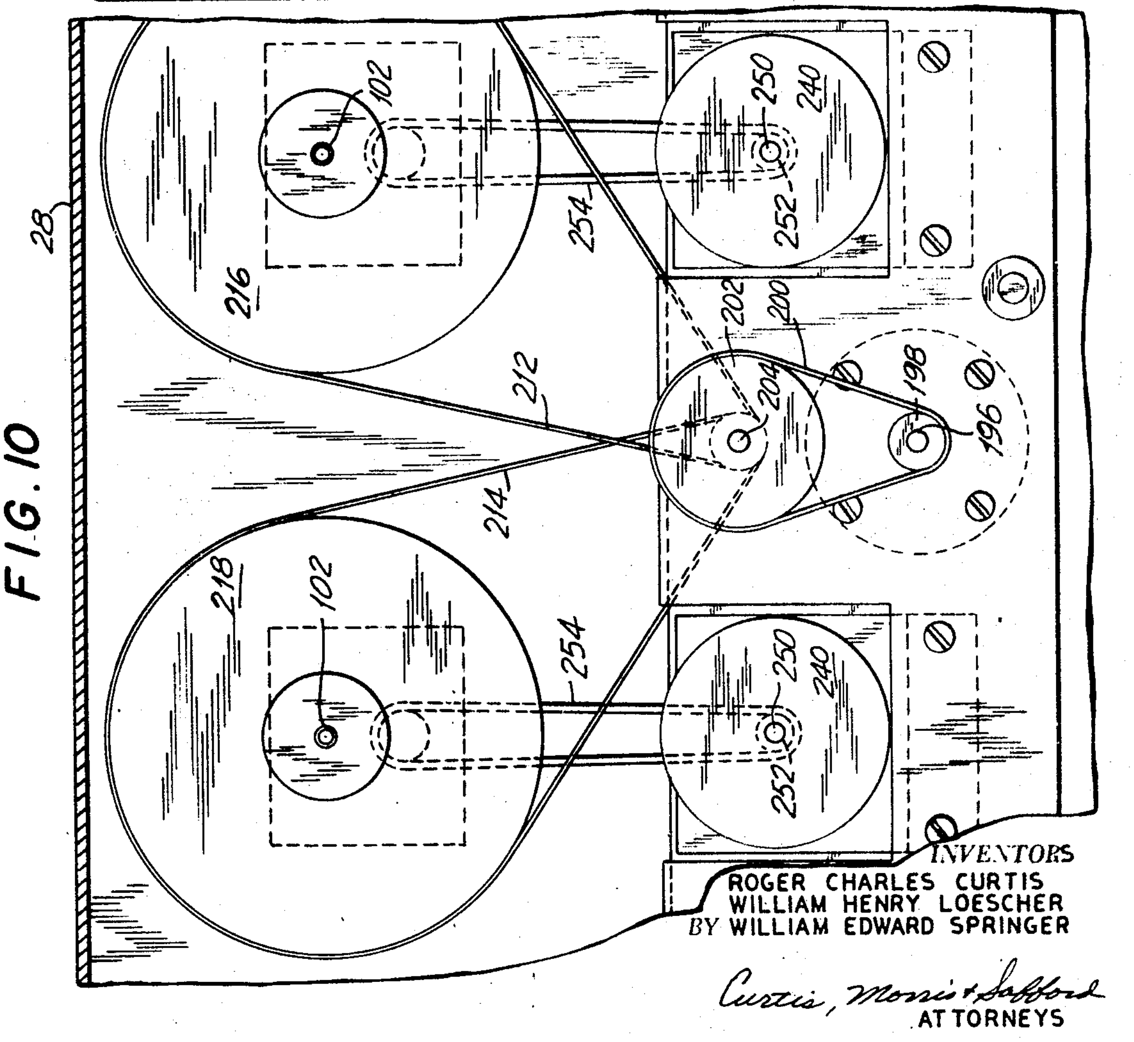
FIG. 10 is an enlarged, elevational view of the rear portion of the dictating and transcribing system showing the various motor drives for rotating the drive capstans.

Reference is now made to FIGS. 10 and 11 for details of the capstans and their drives. Each of the slow-speed forward capstans 102 are driven from the same unidirectional motor 190 mounted on a plate 192 secured to the main frame by bolts 194. The output shaft 196 of motor 190 includes a drive pulley 198 which drives a belt 200 around a pulley 202 fixed to a shaft 204 journaled in a housing 206 secured to the main frame of the machine. Midway between its ends shaft 204 has fixed to it two drive pulleys 208 and 210 which are mechanically linked, as by belts 212 and 214, to flywheels 216 and 218, respectively. Flywheels 216 and 218 are rigidly secured to the drive capstans 102 which are journaled, in a capstan support housing 224 secured to plate 38 in any convenient manner. Thus, it is seen that the motive power for each of the slow-speed capstans 102 is initiated by a common motor 190 which, through belt 200, drives shaft 204 to drive the capstan drive belts 212 and 214 and in turn flywheels 216 and 218.

Each of the high-speed capstans 100 is driven by separate bidirectional high-speed motors 240 suitably secured to housing 206, for example by brackets 240 and 242 which are secured to housing 206 and plate 192 by suitable bolts 244. Each of the output shafts 250 of motors 240 includes a drive pulley 252 which drives a belt 254 passing over a pulley 256 rigidly secured to high-speed capstan 100. Capstan 100 is suitably journaled in the capstan support housing 224. Thus, since each of the high-speed capstans 100 is directly coupled to separate motors 240, the motors can be reversed independently and move the tape high speed forward in one station and high speed reverse in the other station.

In operation, a magazine 44 having an endless loop of magnetic tape 46 randomly wound therein is inserted into the machine frame by positioning the locating pin 97 into a receiving bore 270 in support plate 38 to properly position the magazine 44 with respect to the recording unit 40 and transcribing unit 42. The tape 46 at this point is disposed over tape guide bars 72 in openings 70 at the upper end of the magazine. The tape is now manually raised until sufficient tape is available to allow the tape to be threaded through both the recording and transcribing units. The recording and transcribing system is now ready for operation and, accordingly, the dictator and/or transcriber may operate the machine either separately or simultaneously as tape is drawn from the storage magazine 44 up to either of the dictating or transcribing units and then returned for storage in the magazine.

Since, however, the tape can be moved independently through the recording or transcribing units and can be moved in opposite directions through both units at the same time, there is the possibility that the tape slack stored in random loops in the magazine will become exhausted between two successive operations and become taut. Therefore, provision must be made to sense tape tautness and disconnect the appropriate tape drive systems so that the tape is not broken. Accordingly, the magazine 44 is provided with a pair of tape tautness-sensing levers 272 on each side of the magazine in close proximity to the path of tape travel as it enters the magazine from the guided path of travel between guide tracks 76 and spacer member 56. Each of the levers 272 is pivotally mounted, as at 274, to the rear plate 52 and includes at its lower end a rotatably mounted roller element 276 so that when the tape 46 is drawn close to the tautness-sensing lever there will be rolling contact with the roller element 276. Close to roller element 276, and extending through plate 52, is a pin 278 rigidly secured to the lever 272 and disposed to be slidably movable in an enlarged hole 280 in rear plate 52. Hence, the lever 272 is free to pivot around pivot point 274 to the extent permitted by movement of pin 278 in the enlarged hole 280.

With reference now to FIG. 2 as well, it is seen that microswitch 282 having a response button 284 is positioned such that the elongated pin 280 on tautness-sensing lever 272 in its at rest position, is adjacent the response button 284 of microswitch 282. Hence, if the tape becomes taut between the transcribe unit 42 and the dictate unit 40 the tape will move against the left-hand tape tautness-sensing lever 272 and cause the lever to pivot slightly about pivot point 274 to move pin 278 against response button 284 and actuate the microswitch 282. The microswitch 282 is electrically connected to the recording unit tape drive and, when actuated, disconnects the tape drive in the recording unit thus preventing tape breakage. Similarly, the lever 272 on the right side of the magazine, as viewed in FIG. 2, will activate and disconnect the tape drive in the transcribe unit 42 when tape is drawn taut by reverse movement of the tape through the transcribing unit.

A third tape tautness-sensing mechanism is also provided in the upper central portion of the magazine 44 to sense tape tautness between the recording and transcribing units, for example, if both the dictator and transcriber are moving the tape in opposite directions, or if the transcriber is operating while the dictating station is stopped, or the transcriber is reversing while the dictator is stopped. For this purpose (see FIG. 11) a microswitch 290 having a response button 294 is mounted on panel 38. A pin 296 is positioned to fit in enlarged hole 298 in plate 52 of magazine 44 and is vertically slidably disposed therein in a shoulder bracket 300. In the rest position the shoulder bracket 300 is adjacent the response button 294 of microswitch 290, but when tape between recording unit 40 and transcribe unit 42 becomes taut, it contacts the pin 296 causing the pin and shoulder 300 to move up against response button 294 and actuate microswitch 290 to disconnect the tape drives and prevent tape breakage.

From the foregoing, it is seen that the present invention provides a record and transcribe system utilizing an endless loop of magnetic tape which is randomly wound in serpentine loops in a single-bin storage magazine. The magazine is readily separated from the system to afford ready interchangeability of tape magazines and the tape is accessible from the magazine so that it can be threaded through the record and transcribe units with great facility.

What we claim is:

1. A single-bin, random-wind tape storage magazine adapted to store an endless loop of tape therein comprising:

opposed plate members, spacer members arranged around the periphery of said plate members and joined to each said plate member to form a tape storage cavity, said plate members being spaced from each other a distance slightly greater than the width of the tape stored therein to define a tape storage cavity which limits the position of the tape to a plurality of random-wound folds thereby to preclude entanglement and snarling of said tape within said magazine, means in at least one of said spacer members adapted to permit passage of a loop of said tape from within said magazine to enable said tape to be operably connected to a plurality of independently and bidirectionally driven tape driving means thereby to draw selected portions of said endless loop of tape out of said magazine and back into said magazine, and means within said magazine adapted to sense tape tautness between said tape-driving means as said tape is driven out of and into said magazine, said tape tautness-sensing means adapted to be operatively associated with said tape-driving means to disconnect said tape-driving means when said tape tautness-sensing means are actuated.

2. A tape storage magazine as defined in claim 1 wherein said magazine includes means to confine a portion of said tape to a guided path of tape travel during passage of said tape in said magazine in response to tape movement initiated by at least one of said tape-driving means.

3. A tape storage magazine as defined in claim 2 wherein said means to confine a portion of said tape to a guided path of tape travel comprises tape guide means positioned between said panels adjacent at least one of said spacer members to define a controlled path of tape travel therebetween.

4. In a recording and transcribing system utilizing an endless loop of magnetic tape of substantial length, the combination of:

a housing member adapted to support recording and transcribing means;

a magazine adapted to store the major portion of said endless loop of tape comprising spaced panel members including a peripheral wall member defining a tape storage magazine cavity therein;

said magazine adapted to be selectively positioned within said housing in proximity to said recording and transcribing means;

means along one wall of said magazine permitting access to said tape stored therein thereby to allow said tape to be withdrawn from said magazine and operatively positioned within said recording and transcribing means when said magazine is positioned within said housing;

said means permitting access to said tape comprising a pair of spaced openings in said wall, each said opening including a tape guide member therein which defines on one side thereof a first tape access opening from said magazine and on the other side thereof a second tape access opening from said magazine, said tape being initially positioned in said magazine so as to be looped over each said tape guide member; and reversible tape-driving means in each of said recording and transcribing means to independently draw portions of said tape from said magazine to each of said recording and transcribing means and return said tape to said magazine.

5. A recording and transcribing system as defined in claim 4 including a plurality of tape tautness-sensing means responsive to tape tautness in said magazine which are operably connected to said tape-driving means to disconnect said tape-driving means when said tape is drawn taut between said recording and transcribing means.